(No Model.)
J. C. PEDEN.
MACHINE FOR MAKING SOUR MASH.
No. 249,793. Patented Nov. 22, 1881.
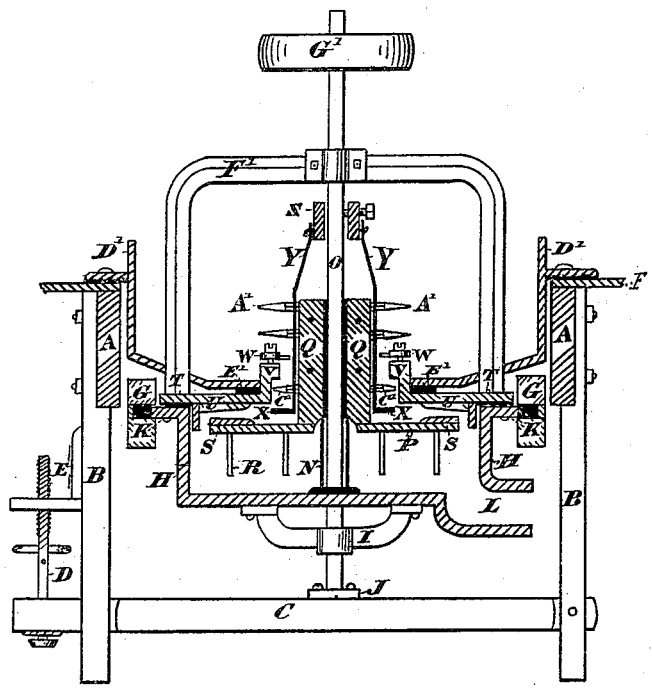
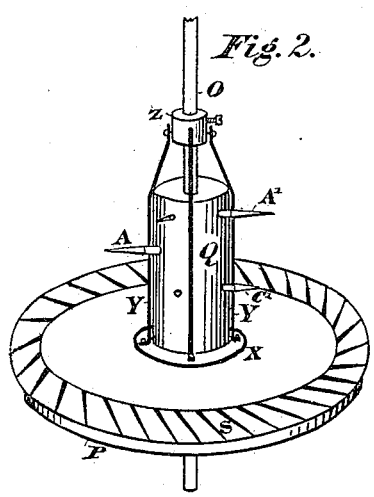
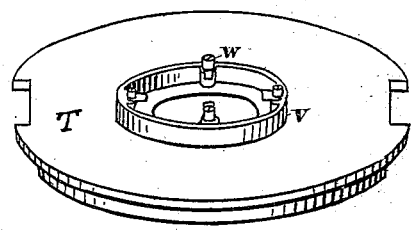
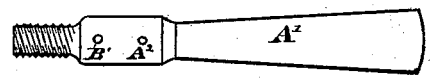
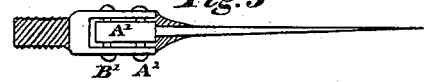
WITNESSES.
C. Hewitt
Frank Pardons
INVENTOR.
John C. Peden
by J. G. Hewitt
Attorney.

United States Patent Office.

JOHN C. PEDEN, OF LAWRENCEBURG, KENTUCKY.

MACHINE FOR MAKING SOUR MASH.

SPECIFICATION forming part of Letters Patent No. 249,793, dated November 22, 1881.

Application filed July 22, 1880. (No model.)

*To all whom it may concern:*

Be it known that I, JOHN C. PEDEN, of Lawrenceburg, in the county of Anderson and State of Kentucky, have invented a new and useful Machine for Making Sour Mash for Distilling Purposes; and I do hereby declare that the following is a full, clear, and exact description of the construction and operation of the same, reference being had to the accompanying drawings, forming part of this specification.

This my invention relates to certain improvements in a machine for making sour mash, the bottom part of which is made of metal, in the form of a pan of the required size, with slightly-flaring sides, high enough to make the depth about one-fourth of its diameter, with a narrow flange around the top edge, and with lugs by which to secure it to the floor or frame. In the center of this pan is a vertical shaft extending up through the entire machine, to which a circular disk-plate is secured within the pan, with teeth on the underside and a raised surface on the top at the verge, and has also an elongated hub in the center, to answer as a raised nut, over which the pan-cap drops loosely, leaving a small opening for the mash to pass through. The underside of the cap at the verge has a raised surface, to correspond with a similar surface on the plate below. These surfaces are all grooved and furrowed similar to a millstone and work together in the same manner. The main driving-shaft, to which the revolving disk-plate is secured, is made adjustable, similar to ordinary millstones, and the cap of the pan has an opening in the center large enough to pass over the hub on the plate below and leave sufficient room for the mash to pass through. Around the opening of the cap a ring or cup is formed, to the top of which knives are secured, projecting inwardly. The hub of the disk-plate is also provided with knives or teeth, inserted in a zigzag manner around it, part of which work within the ring and part above it within the hopper, which is secured to the cap, in which the mash is fed, and where it is thoroughly mixed or broken up by the revolving knives, after which it passes down between the raised surfaces of the plates, where it is more perfectly and thoroughly broken up and mixed, after which it passes off through the pan below.

The object of this my invention is to provide a machine for making sour mash that will thoroughly break up, mix every particle of the mass, and be easily and economically operated. I attain these objects by the mechanism illustrated in the accompanying drawings, in which—

Figure 1 is a sectional view of the machine, showing its general construction with part of the frame left off. Fig. 2 is a perspective view of the revolving disk-plate and shaft, showing the hub, teeth, and raised surface on the plate. Fig. 3 is a perspective view of the cap, showing the raised ring and knives thereon. Fig. 4 is a flat view of one of the teeth or knives that work above the cap-ring. Fig. 5 is an edge view of the knife, showing the form of the blade and hinge-joint.

Similar letters refer to similar parts of the drawings.

This my invention will be more fully illustrated in detail in the drawings, in which—

A A represent the frame or joists of the building. When set in the floor the frame is only intended to represent the timbers of the floor F.

B B are upright posts secured to the joists of the floor, to which the machine is attached.

C is a bridge-tree between the posts B, upon which the working parts of the machine rest, and by which it is adjusted.

D is a screw for raising or lowering the bridge-tree C, when required, and E is the bracket in which it works.

G G are pieces of timber secured to the joists and other parts of the frame on which the machine rests, and to which it is secured by lugs K, formed on the rim of the pan H, which pan rests on the timbers of the frame, and is secured thereto by means of screw-bolts.

H is the bottom pan of the machine, which is made of metal and in form as shown in the drawings.

I is a guide for the driving-shaft on the bottom.

J is the step of the shaft.

L is a discharge-opening in pan H, and N is a tube in the center to prevent the mash from leaking through the shaft-opening.

O is the main driving-shaft, and P is a disk-plate, with its central hub, Q, secured thereon.

R are teeth on the under side of plate P, for agitating the mash, and may consist of any suitable number.

S is the raised surface on plate P, which revolves rapidly when in use.

T is the cap of pan H, which has a small flange on the under side, which enters the pan and holds it in its place when screwed down on the pan.

U is a raised surface on the under side to correspond with a similar surface on plate P below. These raised surfaces are all grooved and furrowed similar to an ordinary millstone.

V is a flange or raised ring on the cap T around the central opening. Knives W, which are made somewhat in the form of a double-edged short sword, are secured permanently on the top of the ring V by means of bolts or otherwise.

X X is a ring-valve for closing the opening in cap T, in order to regulate the flow of mash through between the raised surfaces. This ring-valve is held in its place by metal straps Y, extending up the sides of hub Q between the teeth, and secured to a sliding boss, Z, on shaft O, by which it is raised or lowered to regulate the flow of mash through the opening, and, when set, is held by a set-screw at the side.

A' are the knives, inserted in hub Q above the ring V, and may consist of any required number, placed in a zigzag manner around the hub. These knives are hinged near the hub and made in form as shown in the drawings, with the hinge-pin $A^2$ near the end of the jaws, while the other pin, B', is only a piece of hard wood, intended to yield in case of obstruction before the knife would break.

C' are the short knives within the ring V, and may be made with or without hinges.

D' is the hopper or box into which the mash is fed, and E' is a gum ring under it to prevent leakage, the hopper being secured to the cap T and floor F around it.

F' is the arch for supporting the main shaft O, and G' is the driving-pulley.

The operation of the machine is simply that of putting it in motion, after which pour the mash into the box or hopper D', from which it passes down through the ring-valve X between the disk-plates P and raised surfaces W and S, where it is thoroughly ground and broken up as it passes down and out of the machine.

I do not broadly claim as my invention anything embraced in Patent No. 198,192; but What I do claim as my invention, and desire to secure by Letters Patent, is—

1. In a sour-mash machine, the combination of the pan H and tube N with the disk-plate P, having teeth R, shaft O, and hub Q, with its knives or teeth C' and A', substantially as described, and for the purpose set forth.

2. In a sour-mash machine, the combination, with the pan, of the cap T, having raised surface U, and the disk-plate P, having raised surface S, and dependent teeth R, substantially as herein described, and for the purpose set forth.

3. In a sour-mash machine, the ring-valve X, in combination with the shaft O, hanging strips Y, and sliding boss Z, substantially as described, and for the purpose set forth.

4. The knife A', in combination with the holder hinge-pin $A^2$ and wooden pin B', substantially as described, and for the purpose set forth.

JOHN C. PEDEN.

Witnesses:
C. HEWITT,
FRANK PARDON.